No. 790,806. PATENTED MAY 23, 1905.
M. SAVIDGE.
BISCUIT CUTTER.
APPLICATION FILED NOV. 7, 1903.

Witnesses
Geo. Ackman Jr.
Herbert D. Lawson

Inventor
May Savidge,
By Victor J. Evans
Attorney

No. 790,806.                                                             Patented May 23, 1905.

UNITED STATES PATENT OFFICE.

MAY SAVIDGE, OF ENOLA, PENNSYLVANIA.

BISCUIT-CUTTER.

SPECIFICATION forming part of Letters Patent No. 790,806, dated May 23, 1905.

Application filed November 7, 1903. Serial No. 180,219.

*To all whom it may concern:*

Be it known that I, MAY SAVIDGE, a citizen of the United States, residing at Enola, in the county of Cumberland and State of Pennsylvania, have invented new and useful Improvements in Biscuit-Cutters, of which the following is a specification.

My invention relates to new and useful improvements in biscuit-cutters; and its object is to provide a simple and inexpensive device of this character which is so shaped as to cut three biscuits in two cutting operations.

A further object is to provide a cutter which is constructed in such manner as to prevent the dough from sticking thereto after it has been cut.

With the above and other objects in view the invention consists in providing a cutting-blade which is curved from end to end to form substantially semicircular recesses which are oppositely disposed. A handle is secured to this strip, so as to permit the same to be readily manipulated.

The invention also consists in the novel construction and combination of parts hereinafter more fully described and claimed, and illustrated in the accompanying drawings, in which—

Figure 1:
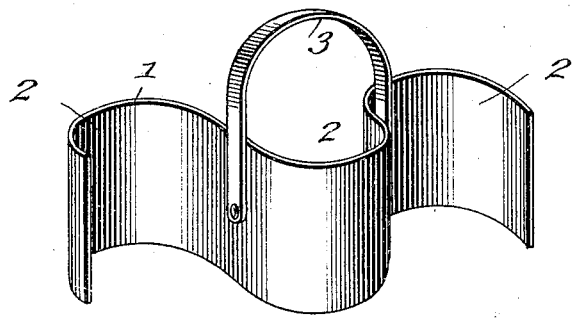
Figure 2:
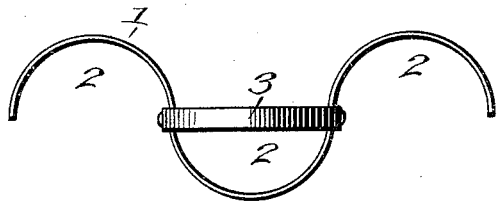
Figure 3:
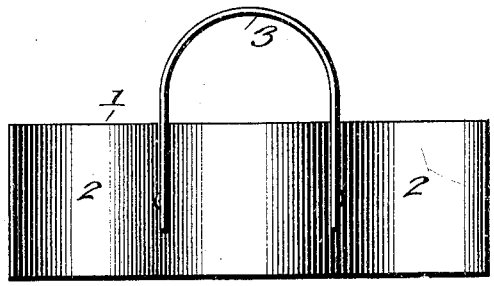

Figure 1 is a perspective view of the biscuit-cutter. Fig. 2 is a plan view thereof. Fig. 3 is a front elevation.

Referring to the figures by numerals of reference, 1 is a cutting-strip, which is formed in a single sheet of metal and which is of any suitable length. This strip is curved in opposite directions to form oppositely-arranged substantially semicylindrical recesses 2. Secured to the walls of the central recess 2 is a handle 3, which is riveted or otherwise secured to the strip 1.

In using the biscuit-cutter the same is pressed downward into the dough as ordinarily, and thereby forming a waved cut. The cutter is then reversed and again pressed into the dough over the cut previously made, thereby forming circular biscuits. In view of the fact that the cutting edge of the device is not continuous and does not inclose the biscuit at any one time during the cutting operation, it will be understood that the dough is prevented from sticking thereto, as is the case where circular or other endless cutters are employed.

In the foregoing description I have shown the preferred form of my invention, but I do not limit myself thereto, as I am aware that modifications may be made therein without departing from the spirit or sacrificing any of the advantages thereof, and I therefore reserve the right to make such changes as fairly fall within the scope of my invention.

Having thus fully described the invention, what is claimed as new is—

A biscuit-cutter comprising a strip of sheet metal shaped to present throughout its length and in plan view an odd number of alternating and reversely-disposed recesses each of substantially half the marginal area of the biscuit to be cut, and a handle spanning the central recess and attached to the cutter.

In testimony whereof I affix my signature in presence of two witnesses.

MAY SAVIDGE.

Witnesses:
    FLORA MESSNER,
    ANNIE WAGOMER.